US010501596B2

(12) United States Patent
Prissok et al.

(10) Patent No.: US 10,501,596 B2
(45) Date of Patent: Dec. 10, 2019

(54) HYBRID SYSTEMS CONSISTING OF FOAMED THERMOPLASTIC ELASTOMERS AND POLYURETHANES

(71) Applicant: BASF SE, Ludwigshafen (DE)

(72) Inventors: Frank Prissok, Lemfoerde (DE); Markus Schuette, Osnabrueck (DE); Frank Braun, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 557 days.

(21) Appl. No.: 14/717,070

(22) Filed: May 20, 2015

(65) Prior Publication Data
US 2015/0252163 A1 Sep. 10, 2015

Related U.S. Application Data

(62) Division of application No. 12/521,875, filed as application No. PCT/EP2008/050172 on Jan. 9, 2008, now abandoned.

(30) Foreign Application Priority Data

Jan. 16, 2007 (EP) .................................... 07100613

(51) Int. Cl.
| | | |
|---|---|---|
| *C08J 9/00* | (2006.01) | |
| *C08G 18/10* | (2006.01) | |
| *C08G 18/42* | (2006.01) | |
| *C08G 18/48* | (2006.01) | |
| *C08G 18/66* | (2006.01) | |
| *C08J 9/32* | (2006.01) | |
| *C08G 18/32* | (2006.01) | |
| *C08G 18/76* | (2006.01) | |
| *C08G 101/00* | (2006.01) | |

(52) U.S. Cl.
CPC ............ *C08J 9/0061* (2013.01); *C08G 18/10* (2013.01); *C08G 18/3206* (2013.01); *C08G 18/4238* (2013.01); *C08G 18/4854* (2013.01); *C08G 18/664* (2013.01); *C08G 18/6674* (2013.01); *C08G 18/7692* (2013.01); *C08J 9/32* (2013.01); *C08G 2101/0008* (2013.01); *C08G 2101/0033* (2013.01); *C08G 2101/0066* (2013.01); *C08G 2101/0083* (2013.01); *C08G 2350/00* (2013.01); *C08G 2410/00* (2013.01); *C08J 2203/22* (2013.01); *C08J 2375/04* (2013.01); *C08J 2475/00* (2013.01); *Y10T 428/249972* (2015.04)

(58) Field of Classification Search
CPC ......... C08J 9/0061; C08J 9/32; C08J 2203/22
See application file for complete search history.

(56) References Cited

U.S. PATENT DOCUMENTS

| | | | |
|---|---|---|---|
| 3,304,273 A | 2/1967 | Stamberger | |
| 3,383,351 A | 5/1968 | Stamberger | |
| 3,503,840 A * | 3/1970 | Parrish | ....................... C08J 9/35 |
| | | | 264/DIG. 17 |
| 3,523,093 A | 8/1970 | Stamberger | |
| 3,594,335 A | 7/1971 | Schultz et al. | |
| 3,878,133 A | 4/1975 | Ruebens | |
| 4,436,869 A | 3/1984 | Zipp et al. | |
| 4,451,583 A | 5/1984 | Chesler | |
| 4,764,537 A | 8/1988 | Horn et al. | |
| 5,026,726 A | 6/1991 | Jagt et al. | |
| 5,252,617 A | 10/1993 | Werner et al. | |
| 5,260,343 A | 11/1993 | Harrison et al. | |
| 5,506,275 A | 4/1996 | Valoppi | |
| 5,665,785 A | 9/1997 | McClellan et al. | |
| 5,885,693 A | 3/1999 | Eder et al. | |
| 6,605,650 B1 | 8/2003 | Roth | |
| 2003/0181536 A1 | 9/2003 | Roth | |
| 2004/0138318 A1 | 7/2004 | McClelland et al. | |
| 2006/0079590 A1 | 4/2006 | Nagazumi et al. | |

FOREIGN PATENT DOCUMENTS

| | | |
|---|---|---|
| CA | 947920 A | 5/1974 |
| DE | 111394 | 7/1899 |
| DE | 1 152 536 | 8/1963 |
| DE | 1 152 537 | 8/1963 |
| DE | 2 007 248 | 9/1971 |
| DE | 2 021 682 | 11/1971 |
| DE | 2 122 482 | 11/1971 |
| DE | 2 215 893 | 12/1972 |
| DE | 2 156 225 | 5/1973 |
| DE | 28 21 001 | 11/1979 |
| DE | 36 07 447 | 9/1987 |
| DE | 41 17 861 C2 | 9/2001 |
| DE | 100 24 097 | 11/2001 |
| EP | 0 029 021 A1 | 5/1981 |
| EP | 0 153 639 | 9/1985 |
| EP | 0 250 351 | 12/1987 |
| EP | 0 364 854 | 4/1990 |

(Continued)

OTHER PUBLICATIONS

Abstract of JP 08-113664 (May 7, 1996).

(Continued)

*Primary Examiner* — James Sanders

(74) *Attorney, Agent, or Firm* — Oblon, McClelland, Maier & Neustadt, L.L.P.

(57) ABSTRACT

The present invention relates to a hybrid material comprising a matrix of polyurethane and foamed particles of thermoplastic polyurethane comprised therein and also a process for producing such hybrid materials and the use of these hybrid materials as bicycle saddles, upholstery and shoe soles.

17 Claims, No Drawings

(56) References Cited

FOREIGN PATENT DOCUMENTS

| | | | | |
|---|---|---|---|---|
| EP | 0 511 570 | 11/1992 | | |
| EP | 0 989 146 | 3/2000 | | |
| EP | 0 897 402 | 3/2001 | | |
| EP | 1 460 094 | 9/2004 | | |
| EP | 1 529 792 | 5/2005 | | |
| EP | 1647577 A1 | 4/2006 | | |
| EP | 1743977 A1 | 1/2007 | | |
| JP | 08-113664 A | 5/1996 | | |
| JP | 08113664 A * | 5/1996 | ............... | C08J 9/18 |
| WO | 97/20568 | 9/1994 | | |
| WO | WO-94/20568 A1 | 9/1994 | | |
| WO | WO-00/44821 A1 | 8/2000 | | |
| WO | 02/077083 | 10/2002 | | |
| WO | 2005/023920 | 3/2005 | | |
| WO | WO 2005/066250 A1 | 7/2005 | | |
| WO | 2005/098763 | 10/2005 | | |
| WO | 2006/015440 | 2/2006 | | |
| WO | 2006/034800 | 4/2006 | | |
| WO | 2007/082838 | 7/2007 | | |
| WO | 2008/058919 | 5/2008 | | |

OTHER PUBLICATIONS

Translation of JP 08-113664 (May 7, 1996).
Notice of Opposition dated Dec. 6, 2018 in European Patent Application No. 08701337.1.
Nasir Mahmood, "Investigations on the Adhesion of Polyurethane Foams on Thermoplastic Material Systems", Dissertation, Jan. 28, 2005, 26 pages.

* cited by examiner

HYBRID SYSTEMS CONSISTING OF FOAMED THERMOPLASTIC ELASTOMERS AND POLYURETHANES

This application is a divisional of U.S. application Ser. No. 12/521,875 filed Jul. 1, 2009, which is a National Stage of PCT/EP2008/050172 filed Jan. 9, 2008, both of which are incorporated herein by reference. This application also claims the benefit of EP 07100613.4 filed Jan. 16, 2007.

DESCRIPTION

The present invention relates to a hybrid material comprising a matrix of polyurethane and foamed particles of thermoplastic polyurethane comprised therein and also a process for producing such hybrid materials and the use of these hybrid materials as floor covering, bicycle saddles, upholstery and shoe soles.

Further embodiments of the present invention are described in the claims, the description and the examples. It goes without saying that the feature of the subject matter of the invention which have been mentioned above and those still to be explained below can be used not only in the combination indicated in each case but also in other combinations without going outside the scope of the invention.

Polyurethanes are nowadays used in many applications because of their broad property profile. Polyurethanes can be used both in compact form and in foamed form, with a very wide density range from compact with a density of greater than about 0.01 g/cm$^3$ up to 1.00 g/cm$^3$ for foamed bodies being possible. Polyurethanes can, for example, be present in the form of thermosets, elastomers, thermoplastic elastomers (TPUs), microcellular elastomers, integral foams, flexible foams, rigid foams or semirigid foams. Further details on this subject may be found in "Kunststoffhandbuch, Volume 7, Polyurethane", Carl Hamer Verlag, 3rd Edition 1993, Chapters 5 to 8 and 10-12.

Combining polyurethane with other materials also makes it possible to produce composites which further expand the field of use of the material "polyurethane". Thus, introduction of foamed particles into a matrix of polyurethane makes it possible to obtain hybrid materials having a reduced density and particular properties and/or to reduce the costs of materials.

DE 2007248 describes foaming of crosslinked polystyrene particles together with a polyurethane reaction mixture. DE 2122482 describes foaming of thermoplastic polymers, e.g. vinyl polymers, polyethylene, polypropylene, polyesters, polyethers and methacrylates, comprising blowing agent in polyurethane foams which are preferably polyether-based and predominantly open-celled. These materials are used mainly as upholstery materials.

Disadvantages of such known materials are poor adhesion between polyurethane matrix and foamed particles and thus a restricted utility. Such composites are, for example, not suitable for applications in which the composite has to react elastically to recurring stresses. A further disadvantage of known hybrid materials is that recycling of material which is not all of the same type is possible to only a limited extent. Furthermore, the use of materials having a high glass transition temperature, for example polystyrene, as foamed particles comprised in the matrix material leads to the elasticity of the hybrid material being low below this glass transition temperature.

WO 2006/015440 discloses hybrid materials comprising a polyurethane matrix and foamed polyurethane particles, for example recycled material, comprised therein. Disadvantages of such composites comprising polyurethane and recycled polyurethane foam is only poor adhesion between the foamed recycled particles and the matrix material. Furthermore, the mechanical properties of such a material are capable of improvement.

It is therefore an object of the present invention to provide a hybrid material which displays improved adhesion between matrix material and foamed particles.

A further object of the invention is to provide a hybrid material which has very good mechanical properties, e.g. improved elasticity and a higher ultimate tensile strength, compared to an analogous material having the same overall density.

The object of the invention is achieved by a hybrid material which comprises a matrix of polyurethane and foamed particles of thermoplastic polyurethane comprised therein. The matrix can completely or partly surround the foamed particles.

Materials in which a foam is enclosed by a matrix material will be referred to as hybrid materials for the purposes of the present invention. Here, the matrix material can be a compact material or likewise be a foam.

For the purposes of the invention, the term polyurethane comprises all known elastic polyisocyanate polyaddition products. These comprise, in particular, massive polyisocyanate polyaddition products, e.g. viscoelastic gels or thermoplastic polyurethanes, and elastic foams based on polyisocyanate polyaddition products, e.g. flexible foams, semirigid foams or integral foams. Furthermore, for the purposes of the invention, elastic polymer blends comprising polyurethanes and further polymers and also foams composed of these polymer blends are encompassed by the term polyurethanes. The matrix is preferably a cured, compact polyurethane binder, an elastic polyurethane foam or a viscoelastic gel.

For the present purposes, a polyurethane binder is a mixture comprising at least 50% by weight, preferably at least 80% by weight and in particular at least 95% by weight, of a prepolymer having isocyanate groups, hereinafter referred to as isocyanate prepolymer. The viscosity of the polyurethane binder according to the invention is preferably in the range from 500 to 4000 mPa·s, particularly preferably from 1000 to 3000 mPa·s, measured at 25° C. in accordance with DIN 53 018.

For the purposes of the invention, polyurethane foams are foams in accordance with DIN 7726. Flexible polyurethane foams according to the invention have a compressive stress as 10% deformation or compressive strength in accordance with DIN 53 421/DIN EN ISO 604 of 15 kPa and less, preferably from 1 to 14 kPa and in particular from 4 to 14 kPa. Semirigid polyurethane foams according to the invention have a compressive stress at 10% deformation in accordance with DIN 53 421/DIN EN ISO 604 of from >15 to <80 kPa. Semirigid polyurethane foams and flexible polyurethane foams according to the invention preferably have a proportion of open cells in accordance with DIN ISO 4590 of greater than 85%, particularly preferably greater than 90%. Further details regarding flexible polyurethane foams and semirigid polyurethane foams according to the invention may be found in "Kunststoffhandbuch, Volume 7, Polyurethane", Carl Hanser Verlag, 3rd Edition 1993, Chapter 5.

For the purposes of the present invention, elastomeric polyurethane foams are polyurethane foams in accordance with DIN 7726 which after brief deformation by 50% of the thickness in accordance with DIN 53 577 have no remaining deformation above 2% of the initial thickness after 10 minutes. The foam can be a semirigid polyurethane foam or a flexible polyurethane foam.

Integral polyurethane foams are polyurethane foams in accordance with DIN 7726 having a surface zone which, due to the shaping process, has a higher density than the core. The overall foam density averaged over the core and the surface zone is preferably above 0.1 g/cm$^3$. Integral polyurethane foams can also be semirigid polyurethane foams or flexible polyurethane foams for the purposes of the invention. Further details regarding integral polyurethane foams according to the invention may be found in "Kunststoffhandbuch, Volume 7, Polyurethane", Carl Hanser Verlag, 3rd Edition 1993, Chapter 7.

The density of the matrix materials is preferably from 1.2 to 0.01 g/cm$^3$. The matrix material is particularly preferably an elastic foam or an integral foam having a density of from 0.8 to 0.1 g/cm$^3$, in particular from 0.6 to 0.3 g/cm$^3$, or compact material, for example a cured polyurethane binder.

The foamed particles comprise a foamed thermoplastic polyurethane material. These foamed particles preferably have a diameter of from 0.1 mm to 10 cm, preferably from 0.5 mm to 5 cm and particularly preferably from 1 mm to 2 cm, and are preferably spherical or ellipsoidal. In the case of nonspherical, for example ellipsoidal, particles, the diameter is taken to be the longest axis. The foamed particles have a density of preferably from 0.005 to 0.50 g/cm$^3$, particularly preferably from 0.01 to 0.3 g/cm$^3$ and in particular from 0.02 to 0.2 g/cm$^3$. The foamed particles preferably have a compact outer skin. Here, reference to a compact skin means that the foam cells in the outer region of the foamed particles are smaller than those in the interior. Particular preference is given to the outer region of the foamed particles having no pores.

The foamed particles are preferably based on a thermoplastic polyurethane produced using polytetrahydrofuran. The molecular weight of the polytetrahydrofuran used is preferably from 600 to 2500 g/mol. In a further preferred embodiment, a polyester polyalcohol having a molecular weight of from 500 to 2500 g/mol, preferably from 600 to 900 g/mol, is used for producing the foamed particles.

A hybrid material comprising a matrix of polyurethane and foamed particles of thermoplastic polyurethane comprised therein is preferably produced by mixing (a) polyisocyanates with (b) compounds having hydrogen atoms which are reactive toward isocyanates, (c') expandable particles of thermoplastic polyurethane which comprise blowing agents in dispersed or dissolved form and, if appropriate, (d) chain extenders and/or crosslinkers, (e) catalysts, (f) blowing agents and (g) further additives and reacting the mixture to form the hybrid material, with the reaction being carried out under conditions which lead to expansion of the expandable particles (c').

In a further embodiment of the invention, the hybrid material of the invention is preferably produced by mixing (a) polyisocyanates with (b) compounds having hydrogen atoms which are reactive toward isocyanates, (c") expanded particles of thermoplastic polyurethane and, if appropriate, (d) chain extenders and/or crosslinkers, (e) catalysts, (f) blowing agents and (g) further additives and reacting the mixture to form the hybrid material.

The organic and/or modified polyisocyanates (a) used for producing the polyurethane composites of the invention comprise the aliphatic, cycloaliphatic and aromatic bifunctional or polyfunctional isocyanates known from the prior art (constituent a-1) and any mixtures thereof. Examples are diphenylmethane 4,4'-diisocyanate, diphenylmethane 2,4'-diisocyanate, mixtures of monomeric diphenylmethane diisocyanates and homologues of diphenylmethane diisocyanate having more than two rings (polymeric MDI), tetramethylene diisocyanate, hexamethylene diisocyanate (HDI), isophorone diisocyanate (IPDI), tolylene 2,4- or 2,6-diisocyanate (TDI) and mixtures of the isocyanates mentioned.

Preference is given to using 4,4'-MDI. The 4,4'-MDI which is preferably used can comprise from 0 to 20% by weight of 2,4' MDI and small amounts of up to about 10% by weight of allophanate- or uretonimine-modified polyisocyanates. It is also possible to use small amounts of polyphenylenepolymethylene polyisocyanate (polymeric MDI). The total amount of these high-functionality polyisocyanates should not exceed 5% by weight of the isocyanate used.

The polyisocyanate component (a) is preferably used in the form of polyisocyanate prepolymers. These polyisocyanate prepolymers can be obtained by reacting polyisocyanates (a-1) as described above, for example at temperatures of from 30 to 100° C., preferably about 80° C., with polyols (a-2) to form the prepolymer. Preference is given to using 4,4'-MDI together with uretonimine-modified MDI and commercial polyols based on polyesters, for example ones derived from adipic acid or polyethers, for example ones derived from ethylene oxide and/or propylene oxide, for producing the prepolymers employed according to the invention.

Polyols (a-2) are known to those skilled in the art and are described, for example, in "Kunststoffhandbuch, Volume 7, Polyurethane", Carl Hanser Verlag, 3rd Edition 1993, Chapter 3.1.

Prepolymers based on ethers are preferably obtained by reacting polyisocyanates (a-1), particularly preferably 4,4'-MDI, with 2- to 3-functional polyoxypropylene polyols and/or polyoxypropylene-polyoxyethylene polyols. They are usually prepared by the generally known base-catalyzed addition of propylene oxide alone or in admixture with ethylene oxide onto H-functional, in particular OH-functional, starter substances. Starter substances employed are, for example, water, ethylene glycol or propylene glycol and also glycerol or trimethylolpropane. Furthermore, multimetal cyanide compounds, known as DMC catalysts, can also be used as catalysts. For example, polyethers as described below under (b) can be used as component (a-2).

When ethylene oxide/propylene oxide mixtures are used, the ethylene oxide is preferably used in an amount of 10-50% by weight, based on the total amount of alkylene oxide. The alkylene oxides can be incorporated blockwise or as a random mixture. Particular preference is given to incorporation of an ethylene oxide end block ("EO cap") in order to increase the content of more reactive primary OH end groups.

The number average molecular weight of the polyols (a-2) is preferably in the range from 1750 to 4500 g/mol.

If appropriate, customary chain extenders or crosslinkers are added to the polyols mentioned in the preparation of the isocyanate prepolymers. Such substances are described below under c). Particular preference is given to using dipropylene glycol or tripropylene glycol as chain extenders or crosslinkers.

Relatively high molecular weight compounds b) having at least two H atoms which are reactive toward isocyanate groups can be, for example, polyetherols or polyesterols.

Polyetherols are prepared by known methods, for example from one or more alkylene oxides having from 2 to 4 carbon atoms in the alkylene radical by anionic polymerization using alkali metal hydroxides or alkali metal alkoxides as catalysts with addition of at least one starter molecule comprising 2 or 3 reactive hydrogen atoms in bound form or by cationic polymerization using Lewis acids such as antimony pentachloride or boron fluoride etherate. Suitable alkylene oxides are, for example, tetrahydrofuran, 1,3-propylene oxide, 1,2- or 2,3-butylene oxide and preferably ethylene oxide and 1,2-propylene oxide. Furthermore, multimetal cyanide compounds, known as DMC catalysts, can also be used as catalysts. The alkylene oxides can be used individually, alternately in succession or as mixtures. Preference is given to mixtures of 1,2-propylene oxide and ethylene oxide, with the ethylene oxide being used in amounts of from 10 to 50% as ethylene oxide end block ("EO cap"), so that the polyols formed have more than 70% primary OH end groups.

Possible starter molecules are water or 2- and 3-functional alcohols such as ethylene glycol, 1,2- and 1,3-propanediol, diethylene glycol, dipropylene glycol, 1,4-butanediol, glycerol or trimethylolpropane.

The polyether polyols, preferably polyoxypropylene-polyoxyethylene polyols, have a functionality of from 2 to 3 and molecular weights of from 1000 to 8000 g/mol, preferably from 2000 to 6000 g/mol.

Polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is possible to use the corresponding dicarboxylic acid derivatives, e.g. dicarboxylic esters of alcohols having from 1 to 4 carbon atoms or dicarboxylic anhydrides. Preference is given to using dicarboxylic acid mixtures of succinic, glutaric and adipic acids in weight ratios of, for example, 20-35:35-50:20-32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, e.g. ε-caprolactone, or hydroxycarboxylic acids, e.g. ω-hydroxycaproic acid.

To prepare the polyester polyols, the organic, e.g. aromatic and preferably aliphatic, polycarboxylic acids and/or derivatives and polyhydric alcohols can be polycondensed in the absence of catalysts or preferably in the presence of esterification catalysts, advantageously in an atmosphere of inert gas, e.g. nitrogen, carbon monoxide, helium, argon, etc., in the melt at temperatures of from 150 to 250° C., preferably from 180 to 220° C., if appropriate under reduced pressure, to the desired acid number which is preferably less than 10, particularly preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers, e.g. benzene, toluene, xylene or chlorobenzene, to azeotropically distill off the water of condensation. To prepare the polyester polyols, the organic polycarboxylic acids and/or derivatives and polyhydric alcohols are advantageously polycondensed in a molar ratio of 1:1-1.8, preferably 1:1.05-1.2.

The polyester polyols obtained preferably have a functionality of from 2 to 4, in particular from 2 to 3, and a molecular weight of from 480 to 3000 g/mol, preferably from 1000 to 3000 g/mol.

Preference is given to using mixtures comprising polyetherols and polyesterols as relatively high molecular weight compound b).

Further suitable polyols are polymer-modified polyols, preferably polymer-modified polyesterols or polyetherols, particularly preferably graft polyethers or graft polyesterols, in particular graft polyetherols. These are polymer polyols which usually have a content of preferably thermoplastic polymers of from 5 to 60% by weight, preferably from 10 to 55% by weight, particularly preferably from 30 to 55% by weight and in particular from 40 to 50% by weight. these polymer polyesterols are described, for example, in WO 05/098763 and EP-A-250 351 and are usually prepared by free-radical polymerization of suitable olefinic monomers, for example styrene, acrylonitrile, (meth)acrylates, (meth) acrylic acid and/or acrylamide, in a polyesterol serving as graft base. The side chains are generally formed by transfer of free radicals from growing polymer chains to polyesterols or polyetherols. The polymer polyol comprises, apart from the graft copolymer, predominantly the homopolymers of the olefins dispersed in unchanged polyesterol or polyetherol.

In a preferred embodiment, acrylonitrile, styrene, acrylonitrile and styrene, particularly preferably exclusively styrene, are used as monomers. The monomers are polymerized, if appropriate in the presence of further monomers, a macromer, a moderator and a free-radical initiator, usually azo or peroxide compounds, in a polyesterol or polyetherol as continuous phase. This process is described, for example, in DE 111 394, U.S. Pat. Nos. 3,304,273, 3,383,351, 3,523, 093, DE 1 152 536 and DE 1 152 537.

During the free-radical polymerization, the macromers are incorporated into the copolymer chain. This results in formation of block copolymers which have a polyester or polyether block and a poly-acrylonitrile-styrene block and act as phase compatibilizers at the interface of continuous phase and disperse phase and suppress agglomeration of the polymer polyesterol particles. The proportion of macromers is usually from 1 to 20% by weight, based on the total weight of the monomers used for preparing the polymer polyol.

If polymer polyol is comprised in the relatively high molecular weight compound b), it is preferably present together with further polyols, for example polyetherols, polyesterols or mixtures of polyetherols and polyesterols. The proportion of polymer polyol is particularly preferably greater than 5% by weight, based on the total weight of the component (b). The polymer polyols can be comprised in an amount of, for example, from 7 to 90% by weight or from 11 to 80% by weight, based on the total weight of the component (b). The polymer polyol is particularly preferably a polymer polyesterol or polymer polyetherol.

As expandable particles (c') of thermoplastic polyurethane which comprise blowing agent in dispersed or dissolved form, it is possible to use, for example, particles of thermoplastic polyurethane impregnated with blowing agent. Such particles and their production are described, for example, in WO 94/20568 and WO 2007/082838.

The expandable particles (c') are particularly preferably produced using thermoplastic polyurethanes (also referred to as TPUs) whose melting range in a DSC measurement at a heating rate of 20 K/min commences below 130° C., particularly preferably below 120° C., and have a melt flow rate (MFR) at 190° C. under a weight of 21.6 kg in accordance with DIN EN ISO 1133 of not more than 250 g/10 min, particularly preferably a melt flow rate of less than 200 g/10 min. The thermoplastic polyurethane comprising blowing agent preferably has a mean diameter of from 0.1 to 10 mm.

Such a thermoplastic polyurethane is preferably based on a polyalcohol, particularly preferably polyether diol. Particular preference is given here to polytetrahydrofuran. The TPU is particularly preferably based on polytetrahydrofuran having a molecular weight of from 600 g/mol to 2500 g/mol. The polyalcohols can be employed either individually or in admixture with one another.

As an alternative, good results can be achieved using a TPU based on polyester alcohol, preferably polyester diol, preferably one based on adipic acid and 1,4-butanediol, having a molecular weight of from 500 to 2500 g/mol, particularly preferably from 600 g/mol to 900 g/mol.

The thermoplastic polyurethane used according to the invention is prepared, for example, by reacting isocyanates (c1) with compounds which are reactive toward isocyanates and have a molecular weight of from 500 to 10 000 (c2) and, if appropriate, chain extenders having a molecular weight of from 50 to 499 (c3), if appropriate in the presence of catalysts (c4) and/or customary auxiliaries and/or additives (c5).

As organic isocyanates (c1), it is possible to use generally known aliphatic, cycloaliphatic, araliphatic and/or aromatic isocyanates, preferably diisocyanates, for example trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate.

As compounds (c2) which are reactive toward isocyanates, it is possible to use the generally known compounds which are reactive toward isocyanates, for example polyesterols, polyetherols and/or polycarbonate diols, which are usually referred to collectively as "polyols", having number average molecular weights of from 500 to 8000 g/mol, preferably from 600 to 6000 g/mol, in particular from 800 to 4000 g/mol, and preferably a mean functionality of from 1.8 to 2.3, preferably from 1.9 to 2.2, in particular 2, and mixtures thereof.

In a particularly preferred embodiment, the compound (c2) which is reactive toward isocyanates is a polytetrahydrofuran having a number average molecular weight of from 600 to 2500 g/mol.

In a further particularly preferred embodiment, the compound (c2) which is reactive toward isocyanates is a polyester alcohol, preferably polyester diol, preferably one based on adipic acid and 1,4-butanediol, having a number average molecular weight of from 500 to 2500 g/mol, particularly preferably from 600 g/mol to 900 g/mol.

As chain extenders (c3), it is possible to use generally known aliphatic, araliphatic, aromatic and/or cycloaliphatic compounds having a molecular weight of from 50 to 499, preferably 2-functional compounds, for example diamines and/or alkanediols having from 2 to 10 carbon atoms in the alkylene radical, in particular 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene glycols and/or polypropyleneglycols, with mixtures of the chain extenders also being able to be used.

As suitable catalysts (c4) which, in particular, accelerate the reaction between the NCO groups of the diisocyanates (c1) and the hydroxyl groups of the formative components (c2) and (c3), it is possible to use the tertiary amines which are known and customary in the prior art, e.g. triethylamine, dimethylcyclohexylamine, N-methylmorpholine, N,N'-dimethylpiperazine, 2-(dimethylaminoethoxy)ethanol, diazabicyclo[2.2.2]octane and the like, and also, in particular, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like. The catalysts are usually used in amounts of from 0.0001 to 0.1 part by weight per 100 parts by weight of polyhydroxyl compound (c2).

Apart from catalysts (c4), customary auxiliaries and/or additives (c5) can also be added to the formative components (c1) to (c3). Examples which may be mentioned are blowing agents, surface-active substances, fillers, flame retardants, nucleating agents, oxidation stabilizers, lubricants and mold release agents, dyes and pigments, if appropriate further stabilizers in addition to the stabilizer mixtures used according to the invention, e.g. stabilizers against hydrolysis, light, heat or discoloration, inorganic and/or organic fillers, reinforcing materials and plasticizers.

Apart from the abovementioned components (c1) and (c2) and, if appropriate, (c3), (c4) and (c5), it is also possible to use chain regulators, usually ones having a molecular weight of from 31 to 499 g/mol. Such chain regulators are compounds which have only one functional group which is reactive toward isocyanates, e.g. monofunctional alcohols, monofunctional amines and/or monofunctional polyols. Such chain regulators enable a particular flow behavior to be set in a targeted manner, particularly in the case of TPUs. Chain regulators can generally be used in an amount of from 0 to 5 parts by weight, preferably from 0.1 to 1 part by weight, based on 100 parts by weight of the component (c2) and by definition come under the component (c3).

The reaction can be carried out at customary indexes, preferably at an index of from 60 to 120, particularly preferably at an index of from 80 to 110. The index is defined as the ratio of the total isocyanate groups of the component (c1) used in the reaction to the groups which are reactive toward isocyanates, i.e. the active hydrogens, of the components (c2) and (c3). At an index of 100, there is one active hydrogen atom, i.e. one group which is reactive toward isocyanates, of the components (c2) and (c3) present per isocyanate group of the component (c1). At indexes below 100, more isocyanate groups than OH groups are present.

The production of the TPUs can be carried out by known methods, either continuously, for example using reaction extruders or the belt process by the one-shot or prepolymer process, or batchwise by the known prepolymer process. In these processes, the components (c1), (c2) and, if appropriate, (c3), (c4) and/or (c5) to be reacted can be mixed in succession or simultaneously with one another, resulting in the reaction commencing immediately.

In the extruder process, the formative components (c1), (c2) and, if appropriate, (c3), (c4) and/or (c5) are introduced either individually or as a mixture into the extruder and reacted at, for example, temperatures of from 100 to 280° C., preferably from 140 to 250° C., and the TPU obtained is extruded, cooled and pelletized. It may be advantageous to heat the resulting TPU at from 80 to 120° C., preferably from 100 to 110° C., for a period of from 1 to 24 hours before further processing.

To produce the expandable particles (c') of thermoplastic polyurethane, the TPU according to the invention is preferably laden with blowing agent in the suspension or extrusion process.

In the suspension process, the thermoplastic polyurethane is used as pellets and is heated to above the softening temperature together with water, a suspension aid and the blowing agent in a closed reactor. The polymer particles are impregnated with the blowing agent during this procedure. The impregnation temperature is preferably greater than 100° C. and is particularly preferably in the range from 100 to 150° C., in particular from 110 to 145° C. Under the impregnation conditions, blowing agent diffuses into the polymer pellets. The impregnation time is generally from 0.5 to 10 hours. The hot suspension is subsequently cooled, resulting in the particles solidifying with inclusion of the blowing agent, and the reactor is depressurized. This gives expandable TPU particles which are finally separated off from the suspension in a customary way. Adhering water is generally removed by drying, e.g. in a flow dryer. If necessary, adhering suspension aid can be removed before and/or afterwards treating the particles with a suitable reagent. For example, the particles can be treated with an acid such as nitric acid, hydrochloric acid or sulfuric acid in order to remove atom-soluble suspension aids, e.g. metal carbonates or tricalcium phosphate.

Suitable TPU pellets are, for example, minipellets having a preferred mean diameter of from 0.2 to 10 mm, in particular from 0.5 to 5 mm. These usually cylindrical or round minipellets are produced by extrusion of the TPU and, if appropriate, further additives, expression from the extruder, if appropriate cooling and pelletization. In the case of cylindrical minipellets, the length is preferably from 0.2 to 10 mm, in particular from 0.5 to 5 mm.

As blowing agents for the suspension process, preference is given to using organic liquids or inorganic gases or mixtures thereof. Halogenated hydrocarbons are possible as organic liquids, but preference is given to saturated, aliphatic hydrocarbons, in particular those having from 3 to 8 carbon atoms, e.g. butane and pentane. Suitable inorganic gases are nitrogen, air, ammonia or carbon dioxide. It is also possible to use mixtures of the blowing agents mentioned. The amount of blowing agent is preferably from 0.1 to 40 parts by weight, in particular from 0.5 to 35 parts by weight and particularly preferably from 1 to 30 parts by weight, based on 100 parts by weight of TPU used.

Suitable suspension aids are water-insoluble inorganic stabilizers such as tricalcium phosphate, magnesium pyrophosphate, metal carbonates; also polyvinyl alcohol and surfactants such as sodium dodecylarylsulfonate. They are usually used in amounts of from 0.05 to 10% by weight, based on the thermoplastic polyurethane.

In the extrusion process, the thermoplastic polyurethane is melted in an extruder and mixed with a blowing agent which is fed into the extruder. The mixture comprising blowing agent is expressed and pelletized under such pressure and temperature conditions that it does not expand. An industrially advantageous method is underwater pelletization in a water bath which has a temperature below 100° C. and is under a pressure of at least 2 bar (absolute). The temperature must not be too low since otherwise the melt solidifies at the die plate and must not be too high since otherwise the melt expands. The higher the boiling point of the blowing agent and the lower the amount of blowing agent, the higher can the water temperature be and the lower can the water pressure be. In the case of the particularly preferred blowing agents pentane or butane, the optimal water bath temperature is from 30 to 60° C. and the optimal water pressure is from 8 to 12 bar (absolute). Other suitable cooling media can also be used instead of water. It is likewise possible to employ water ring pelletization. Here, the cutting space is encapsulated in such a way that the pelletization apparatus can be operated under superatmospheric pressure. This gives expandable particles of thermoplastic polyurethane which are subsequently separated off from the water and, if appropriate, dried.

Possible extruders are all customary screw machines, in particular single-screw and twin-screw extruders (e.g. model ZSK from Werner & Pfleiderer), Ko-Kneters, Kombiplast machines, MPC kneading mixers, FCM mixers, KEX kneading screw extruders and shearing roll extruders, as are described, for example, in Saechtling (editor), Kunststoff-Taschenbuch, 27th Edition, Hanser-Verlag Munich 1998, Chapters 3.2.1 and 3.2.4. The extruder is usually operated at a temperature at which the TPU is present as a melt, for example from 150 to 250° C., in particular from 180 to 210° C. Speed of rotation, length, diameter and design of the extruder screw(s), amounts fed in and extruder throughput are selected in a known manner so that the additives are uniformly distributed in the extruded TPU.

In the extrusion process, volatile organic compounds having a boiling point at atmospheric pressure of 1013 mbar of from −25 to 150° C., in particular from −10 to 125° C., are used as blowing agents. Well-suited blowing agents are hydrocarbons which are preferably halogen-free, in particular $C_{4-10}$-alkanes, for example the isomers of butane, pentane, hexane, heptane and octane, particularly preferably s-pentane. Further suitable blowing agents are relatively bulky compounds such as alcohols, ketones, esters, ethers and organic carbonates. It is also possible to use mixtures of the blowing agents mentioned. These blowing agents are preferably used in an amount of from 0.1 to 40 parts by weight, particularly preferably from 0.5 to 35 parts by weight and in particular from 1 to 30 parts by weight, based on 100 parts by weight of thermoplastic polyurethane used.

If previously expanded particles (c") of thermoplastic polyurethane are used in place of expandable particles (c') of thermoplastic polyurethane in the process of the invention for producing the hybrid material of the invention, these are preferably obtained by expansion of the expandable particles (c'), for example when the impregnated pellets are depressurized at temperatures above the softening temperature of the thermoplastic polyurethane in the suspension process or when the output from the extruder is not cooled in the extrusion process.

The hybrid materials according to the invention can be produced with or without concomitant use of (d) chain extenders and/or crosslinkers. However, the addition of chain extenders, crosslinkers or, if appropriate, mixtures thereof can prove to be advantageous for modifying the mechanical properties, e.g. the hardness. Chain extenders and/or crosslinkers are substances having a molecular weight of preferably less than 400 g/mol, particularly preferably from 60 to 400 g/mol, with chain extenders having 2 hydrogen atoms which are reactive toward isocyanates and crosslinkers having 3 hydrogen atoms which are reactive toward isocyanate. These can be used individually or in the form of mixtures. Preference is given to using diols and/or triols having molecular weights of less than 400, particularly preferably from 60 to 300 and in particular from 60 to 150. Possible chain extenders/crosslinkers are, for example, aliphatic, cycloaliphatic and/or araliphatic diols having from 2 to 14, preferably from 2 to 10 carbon atoms, e.g. ethylene glycol, 1,2-propanediol, 1,3-propanediol, 1,3-butanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols, such as 1,2,4-, 1,3,5-trihydroxycyclohexane, glycerol and trimethylolpropane, and low molecular weight hydroxyl-comprising polyalkylene oxides based on ethylene oxide and/or 1,2-propylene oxide and the abovementioned diols and/or triols as starter molecules.

If chain extenders, crosslinkers or mixtures thereof are employed, these are advantageously used in amounts of from 1 to 60% by weight, preferably from 1.5 to 50% by weight and in particular from 2 to 40% by weight, based on the weight of the components (b) and (d).

If catalysts (e) are used for producing the hybrid materials according to the invention, preference is given to using compounds which strongly accelerate the reaction of the hydroxyl-comprising compounds of the component (b) and, if appropriate, (c) with the organic, if appropriate modified polyisocyanates (a). Mention may be made by way of example of amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, bis(dimethylaminoethyl) ether, bis (dimethylaminopropyl)urea, dimethylpiperazine, 1,2-dimethylimidazole, 1-azabicyclo[3.3.0]octane and preferably 1,4-diazabicyclo[2.2.2]octane and alkanolamine compounds such as triethanolamine, triisopropanolamine, N-methyldiethanolamine and N-ethyldiethanolamine and dimethylethanolamine. It is likewise possible to use organic metal compounds, preferably organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octanoate or mixtures of thereof. The organic metal compounds can be used either alone or preferably in combination with strongly basic amines. If the component (b) is an ester, preference is given to using exclusively amine catalysts.

Preference is given to using from 0.001 to 5% by weight, in particular from 0.05 to 2% by weight, of catalyst or catalyst combination, based on the weight of the component (b).

Furthermore, blowing agents (f) are present as matrix material in the production of polyurethane foams. If appropriate, these blowing agents comprise water (referred to as constituent (f-1)). Apart from water (f-1), it is possible to make additional use of generally known chemically and/or physically acting compounds as blowing agents (f) (the further chemical blowing agents are referred to as constituent (f-2) and the physical blowing agents are referred to as constituents (f-3)). For the purposes of the present invention, chemical blowing agents are compounds which form gaseous products by reaction with isocyanate, e.g. formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons and ethers, esters, ketones and/or acetals, for example (cyclo)aliphatic hydrocarbons having from 4 to 8 carbon atoms, or fluorocarbons such as Solkane® 365 mfc. In a preferred embodiment, a mixture of these blowing agents comprising water is used as blowing agent; in particular, water is used as sole blowing agent. If no water is used as blowing agent, preference is given to using exclusively physical blowing agents.

In a preferred embodiment, the content of (f-1) water is from 0.1 to 2% by weight, preferably from 0.2 to 1.5% by weight, particularly preferably from 0.3 to 1.2% by weight, in particular from 0.4 to 1% by weight, based on the total weight of the components (a) to (g).

In a further preferred embodiment, hollow microspheres comprising physical blowing agent are added as additional blowing agent in the reaction of the components (a), (b) and, if appropriate, (d). The hollow microspheres can also be used in admixture with water (f-1), the abovementioned chemical blowing agents (f-2) and/ or physical blowing agents (f-3).

The hollow microspheres usually comprise a shell of thermoplastic polymer and have the core filled with a liquid, low-boiling substance based on alkanes. The production of such hollow microspheres is described, for example, in U.S. Pat. No. 3,615,972. The hollow microspheres generally have a diameter of from 5 to 50 μm. Examples of suitable hollow microspheres are obtainable under the trade name Expancell® from Akzo Nobel.

The hollow microspheres are generally added in an amount of from 0.5 to 5%, based on the total weight of the components (b), (d) and (f).

Auxiliaries and/or additives (g) may, if appropriate, also be added to the reaction mixture for producing the hybrid materials according to the invention. Mention may be made by way of example of surface-active substances, foam stabilizers, cell regulators, mold release agents, fillers, dyes, pigments, hydrolysis inhibitors, odor-absorbing substances and fungistatic and bacteriostatic substances.

Possible surface-active substances are, for example, compounds which serve to aid the homogenization of the starting materials and may also be suitable for regulating the cell structure. Examples which may be mentioned are emulsifiers such as the sodium salts of castor oil sulfates or fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzene- or dinaphthylmethanedisulfonic acid and ricinoleic acid; foam stabilizers such as siloxane-oxalkylene copolymers and other organopolysiloxanes, ethoxylated alkylphenols, oxethylated fatty alcohols, paraffin oils, castor oil or ricinoleic esters, Turkey red oil and peanut oil, and cell regulators such as paraffins, fatty alcohols and dimethylpolysiloxanes. Oligomeric acrylates having polyoxyalkylene and fluoroalkane radicals as side groups are also suitable for improving the emulsifying reaction, the cell structure and/or stabilizing the foam. The surface-active substances are usually employed in amounts of from 0.01 to 5 parts by weight, based on 100 parts by weight of the component (b).

Examples of suitable mold release agents are: reaction products of fatty acid esters with polyisocyanates, salts of polysiloxanes comprising amino groups and fatty acids, salts of saturated or unsaturated (cyclo)aliphatic carboxylic acids having at least 8 carbon atoms and tertiary amines and also, in particular, internal mold release agents such as carboxylic esters and/or carboxamides prepared by esterification or amidation of a mixture of montanic acid and at least one aliphatic carboxylic acid having at least 10 carbon atoms with at least bifunctional alkanolamines, polyols and/or polyamines having molecular weights of from 60 to 400 (EP-A-153 639), mixtures of organic amines, metal salts of stearic acid and organic monocarboxylic and/or dicarboxylic acids or their anhydrides (DE-A-3 607 447) or mixtures of an imino compound, the metal salt of a carboxylic acid and, if appropriate, a carboxylic acid (U.S. Pat. No. 4,764,537).

For the purposes of the present invention, fillers, in particular reinforcing fillers, are the customary organic and inorganic fillers, reinforcing materials, weighting agents, agents for improving the abrasion behavior in paints, coatings, etc. known per se. Specific examples are: inorganic fillers such as siliceous minerals, for example sheet silicates such as antigorite, bentonite, serpentin, hornblendes, amphibols, chrysotile, talc; metal oxides such as kaolin, aluminum oxides, titanium oxides, zinc oxide and iron oxides, metal salts such as chalk, barite and inorganic pigments such as cadmium sulfide, zinc sulfide and also glass, etc. Preference is given to using kaolin (China clay), aluminum silicate and coprecipitates of barium sulfate and aluminum silicate and also natural and synthetic fibrous minerals such as wollastonite, metal fibers and in particular glass fibers of various lengths which may be coated with a size. Examples of organic fillers are: carbon black, melamine, rosin, cyclopentadienyl resins and graft polymers and also cellulose fibers, polyamide fibers, polyacrylonitrile fibers, polyurethane fibers, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50% by weight, preferably from 1 to 40% by weight, based on the weight of the components (a) to (c), although the content of mats, nonwovens and woven fabrics of natural and synthetic fibers can reach values up to 80% by weight.

The specific starting substances (a) to (g) for producing hybrid materials according to the invention differ quantitatively and qualitatively only slightly when a compact material, a thermoplastic polyurethane, a viscoelastic gel, a flexible foam, a semirigid foam or an integral foam is to be produced as polyurethane according to the invention. Thus, for example, no blowing agents are used for producing massive polyurethanes. Furthermore, the elasticity and hardness of the polyurethane according to the invention can, for example, be varied via the functionality and chain length of the relatively high molecular weight compound having at least two reactive hydrogen atoms. Viscoelastic polyurethane gels can further comprise a dispersion medium, for example water or an organic solvent, which leads to the polyurethane swelling to form a polyurethane gel. Such modifications are known to those skilled in the art.

Starting materials and processes for producing a compact polyurethane are described, for example, in EP 0989146 or EP 1460094, especially for producing polyurethane binders for producing sheet-like polyurethane materials in DE 2 156 225 and DE 2 215 893 and also DE 2021 682 and DE 2 821 001 and PCT/EP2007/062187, starting materials and processes for producing a flexible foam and a semirigid foam are described in PCT/EP2005/010124 and EP 1529792, starting materials and processes for producing polyurethane gels are described in EP 511570 and DE 10024097 and starting materials and processes for producing an integral foam are described in EP 364854, U.S. Pat. No. 5,506,275 or EP 897402. The expandable particles (c') or the expanded particles (c") are then in each case added to the starting materials described in these documents, with the ratios of the other starting materials relative to one another preferably not changing in each case.

In a hybrid material according to the invention, the proportion by volume of the foamed particles of thermoplastic polyurethane is preferably 20% by volume or more, particularly preferably 50% by volume or more, more preferably 80% by volume or more and in particular 90% by volume or more, in each case based on the volume of the hybrid system of the invention.

In a preferred embodiment, the hybrid materials of the invention are integral foams. For this purpose, the polyisocyanates (a) are reactive with the compounds having hydrogen atoms which are reactive toward isocyanates (b), blowing agents (f) and the expandable particles of thermoplastic polyurethane (c') which comprise blowing agent in dispersed or dissolved form or the expanded particles of thermoplastic polyurethane (c") and also, if appropriate, chain extenders and/or crosslinkers (d), catalysts (e) and the further additives (g) in such amounts that the equivalence ratio of NCO groups of the polyisocyanates (a) to the sum of the reactive hydrogen atoms of the components (b) and, if present, (d) and (f) is from 1:0.8 to 1:1.25, preferably from 1:0.9 to 1:1.15.

The integral foams are preferably produced by the one-shot process by means of the low-pressure or high-pressure technique in closed, advantageously heated molds. The molds usually comprise metal, e.g. aluminum or steel. These methods are described, for example, by Piechota and Röhr in "Integralschaumstoff", Carl-Hanser-Verlag, Munich, Vienna, 1975, or in the Kunststoff-Handbuch, Volume 7, Polyurethane, 3rd Edition, 1993, chapter 7.

The starting components are for this purpose mixed at a temperature of from 15 to 90° C., preferably from 20 to 35° C., and introduced into the closed mold, if appropriate under superatmospheric pressure. Mixing can be carried out mechanically by means of a stirrer or a stirring screw or under high pressure in the countercurrent injection process. The mold temperature is advantageously from 20 to 90° C., preferably from 30 to 60° C.

The amount of reaction mixture introduced into the mold is calculated so that the integral foam moldings obtained have a density of from 0.08 to 0.70 g/cm$^3$, in particular from 0.12 to 0.60 g/cm$^3$. The degrees of compaction for production of the moldings having a compacted surface zone and a cellular core are in the range from 1.1 to 8.5, preferably from 2.1 to 7.0.

The process of the invention makes if possible to produce hybrid materials having a matrix of polyurethane and foamed particles of thermoplastic polyurethane comprised therein, with the foamed particles being homogeneously distributed. Particularly when using expandable particles (c') in the process for producing the hybrid materials of the invention, no specific auxiliaries or apparatuses are required to ensure homogeneous distribution after introduction of the starting substances into the mold. Furthermore, the expandable particles can also easily be used in a process according to the invention since because of their small size they are free-flowing and make no specific demands on the processing procedure.

If previously expanded particles (c") of thermoplastic polyurethane are used for producing integral polyurethane foams or compact moldings, the procedure employed is, because of the high density difference between the reaction mixture of the as yet unreacted matrix material and the expanded particles (c") of thermoplastic polyurethane, to fill a closed mold with the expanded particles and subsequently to inject the reaction mixture comprising the other constituents (a), (b) and, if appropriate, (d), (e), (f) and (g). Techniques for homogeneously distributing the expanded particles (c"), e.g. slow rotation of the mold, may be employed if appropriate, especially in the case of low degrees of fill with the expanded particles (c").

The hybrid materials of the invention, in particular hybrid materials having a matrix of cellular polyurethane, display very good adhesion of the matrix material to the expanded particles of thermoplastic polyurethane. A hybrid material according to the invention does not rupture at the interface of matrix material and expanded particles of thermoplastic polyurethane. It is therefore possible to produce hybrid materials which have improved mechanical properties, e.g. tear propagation resistance and elasticity, compared to conventional polyurethane materials having the same density. Thus, the tear propagation resistance determined by a method based on ASTM D3574F of a hybrid material according to the invention having a cellular matrix is preferably greater than 2.5 N/mm at an average density of the hybrid material of from 0.4 to 0.5 g/cm$^3$, preferably greater than 2.2 N/mm at an average density of the hybrid material of from 0.3 to <0.4 g/cm$^3$, preferably greater than 2.0 N/mm at an average density of the hybrid material of from 0.2 to <0.3 g/cm$^3$ and preferably greater than 1.0 N/mm at an average density of the hybrid material of from 0.1 to <0.2 g/cm$^3$. A hybrid material having a matrix of cellular polyurethane preferably has an average density of the hybrid material of from 0.05 to 0.60 g/cm$^3$, particularly preferably from 0.01 to 0.50 g/cm$^3$ and in particular from 0.02 to 0.30 g/cm$^3$.

The elasticity of hybrid materials according to the invention in the form of integral foams is preferably greater than 40% and particularly preferably greater than 50% in accordance with DIN 53512.

Furthermore, the hybrid materials of the invention based on integral foams display high rebound resiliencies at low density. Integral foams based on hybrid materials according to the invention, in particular, are therefore highly suitable as materials for shoe soles. Light and comfortable soles having good durability properties are obtained in this way. Such materials are particularly suitable as throughsoles for sport shoes.

A further advantage of a process according to the invention based on integral foams for producing hybrid materials is that hybrid materials having a low average density, in particular integral foams, can be produced without the disadvantages usual in the production of conventional foams having the same density, e.g. sunken places or regions where the skin is detached, occurring. As a result, fewer rejects are obtained, so that costs can be saved.

Further possible uses of hybrid materials according to the invention having a cellular matrix are upholstery, for example of furniture, and mattresses.

Hybrid materials having a viscoelastic gel matrix display, in particular, increased viscoelasticity and improved elastic properties. These materials are thus likewise suitable as upholstery materials, for example for seats, especially saddles such as bicycle saddles or motorcycle saddles.

In a further preferred embodiment, the hybrid materials of the invention are sheet-like materials which can be used as floor coverings. They are produced by mixing the expanded particles (c") and polyurethane binder in amount of from 1 to 20 parts by weight, preferably from 3 to 10 parts by weight, of expanded particles (c") per 1 part by weight of the polyurethane binder in a manner known per se, if appropriate with addition of the auxiliaries and additives mentioned below, for example in a mechanical mixer. If appropriate, parts of the expanded particles (c") can be replaced by other granular polymers, for example rubber.

The polyisocyanate prepolymers for producing the sheet-like materials according to the invention can be obtained by reacting above-described polyisocyanates (a), for example at temperatures of from 30 to 100° C., preferably about 80° C., with compounds (b) which are reactive toward isocyanates and, if appropriate, chain extenders and/or crosslinkers (d) to give the prepolymer. Polyisocyanate (a) and compound (b) which is reactive toward isocyanate and, if appropriate, chain extenders and/or crosslinkers (d) are preferably mixed with one another in a ratio of isocyanate groups to groups which are reactive toward isocyanates of from 1.5:1 to 15:1, preferably from 1.8:1 to 8:1. To produce the prepolymers, polyisocyanates and the compound having groups which are reactive toward isocyanates and chain extenders and/or crosslinkers are particularly preferably mixed with one another in such a ratio that the NCO content of the prepolymer produced is in the range from 1.0 to 20% by weight, in particular from 2 to 15% by weight, based on the total weight of the isocyanate prepolymer produced. Volatile isocyanates are subsequently preferably separated off, preferably by thin film distillation. Here, the viscosity of the polyisocyanate prepolymers is preferably from 1000 to 3000 mPa·s at 25° C. Polyisocyanate prepolymers according to the invention which are based on tolylene diisocyanate typically have a viscosity of from 1000 to 1500 mPa·s, while polyisocyanate prepolymers according to the invention which are based on diphenylmethane diisocyanate typically have a viscosity of from 2000 to 3000 mPa·s, in each case at 25° C.

Furthermore, the preparation of the prepolymer having isocyanate groups can be carried out stepwise. For this purpose, the compound (b) which is reactive toward isocyanate and, if appropriate, chain extenders and/or crosslinkers (d) are reacted with 2,4-tolylene diisocyanate and/or 2,6-tolylene diisocyanate to an NCO content of 2-5% by weight, based on the prepolymer obtained, in a first step. In a second step, the prepolymer which has been prepared in this way is admixed with isocyanates of the diphenylmethane diisocyanate series or derivatives thereof, for example diphenylmethane 2,4'-diisocyanate and diphenylmethane 4,4'-diisocyanate and homologues of diphenylmethane diisocyanate having more than two rings (polymeric MDI) and/or modified diphenylmethane diisocyanates which are liquid at room temperature, in particular diphenylmethane diisocyanates modified by carbodiimide, urethane, allophanate, isocyanurate, urea and/or biuret groups, until the NCO content of the prepolymer produced has a value corresponding to the values indicated above. In this way, the content of monomeric isocyanate having a molar mass of less than 249 g/mol can be kept low. These polyisocyanate prepolymers which have been prepared stepwise typically have a viscosity in the range from 2000 to 3000 mPa·s at 25° C.

To produce the binder, further additives such as surface-active substances, plasticizers, inorganic fillers such as sand, kaolin, chalk, barium sulfate, silicon dioxide, oxidation inhibitors, dyes and pigments, stabilizers, e.g. against hydrolysis, light, heat or discoloration, inorganic and/or organic fillers, emulsifiers, flame retardants, ageing inhibitors, bonding agents and reinforcing materials are added to the isocyanate prepolymer.

Curing of the mixture of the polyurethane binder and the expanded particles (c") can be effected by addition of further compounds (b) which are reactive toward isocyanate and/or chain extenders or crosslinkers (d), known as the two-component process. As an alternative, curing can be effected exclusively by the action of water, known as the one-component process. Curing is preferably effected exclusively by the action of water, particularly preferably by means of atmospheric moisture. Accelerated curing can be achieved by spraying with water or else by means of steam treatment. If the sheet-like material according to the invention is produced by the one-component process, preference is given to using no chain extenders or crosslinkers (d) for preparing the prepolymer having isocyanate groups. The curing process can be accelerated by introduction of catalysts e) which are customary in polyurethane chemistry.

The physical properties of the elastic sheet-like structures produced according to the invention, e.g. elasticity, hardness, bulk density and water permeability, can be varied within wide limits by variation of size, shape and nature of the expanded particles (c"), addition of further granular polymers such as granulated rubber, by means of the binder content, the average NCO functionality of the binder, the content of isocyanate groups in the binder, degree of compaction and curing conditions.

The shaping of the sheet-like material according to the invention is usually carried out by pouring, distributing and densifying the mixture of polyurethane binder and granular polymers on the substrates to be coated in each case, e.g. concrete, screed or asphalt, in the desired layer thickness, which in the case of the fields of use mentioned is generally from 2 to 30 mm, by means of machines and tools which are known per se for the production of floor coverings and road surfacing. However, shaping can also be carried out in molds or presses which may be heated if appropriate, with the sheet-like structures being obtained in the form of plates after curing, and these can then be laid in a manner known per se to produce the coverings mentioned. Water, particularly preferably in the form of steam, is preferably added in shaping and curing in heated molds or presses in order to accelerate curing.

The sheet-like materials according to the invention have increased durability and strength, which is reflected, in particular, in an increased tensile strength and elongation at break, compared to known sheet-like materials from the prior art. In addition, sheet-like materials according to the invention have a low density, as a result of which less material can be used. Furthermore, the compact skin of the expanded particles (c") leads to relatively small amounts of binder being required. Finally, the emission of vapors which are harmful to health from the sheet-like materials according to the invention can be reduced compared to known sheet-like materials by replacement of rubber in sheet-like materials known from the prior art by expanded particles (c"). Sheet-like materials according to the invention are therefore particularly suitable as surfacing for playgrounds, athletics tracks, playing fields and sports halls.

The invention is illustrated by the following examples:

Production of the Expandable Particles

Starting out from one mol of a polyester polyol having a number average molecular weight of 800 g/mol and based on adipic acid and 1,4-butanediol, pellets of a thermoplastic polyurethane (TPU A) having a mean particle weight of about 2 mg were produced by reaction with 0.44 mol of 1,4-butanediol and 1.44 mol of 4,4'-MDI. In addition, starting out from 1 mol of polytetrahydrofuran having a number average molecular weight of 1333 g/mol, pellets of a thermoplastic polyurethane (TPU B) having a mean particle weight of likewise about 2 mg were produced analogously by reaction with 0.97 mol of 1,4-butanediol and 1.97 mol of 4,4'-MDI.

In an autoclave, 100 parts by weight of the thermoplastic polyurethane A (TPU A) or B (TPU B) were in each case mixed with, in succession, 250 parts of water, 6.7 parts of tricalcium phosphate and 20 parts of n-butane while stirring and heated to the temperature indicated in table 1. The contents of the pressure vessel were then discharged and depressurized through a bottom valve, with the pressure in the vessel being kept constant by injection of further nitrogen or the blowing agent used. The foam particles were freed of adhering residues of the auxiliary by washing with nitric acid and water and air dried at 50° C.

The impregnation conditions and the bulk densities of the expanded particles obtained are shown in table 1.

TABLE 1

| TPU | n-Butane [parts by weight] | Temperature [° C.] | Bulk density [g/l] |
|---|---|---|---|
| TPU A | 20 | 112 | 300 |
| TPU A | 20 | 114 | 170 |
| TPU B | 20 | 119 | 240 |
| TPU B | 20 | 120 | 190 |
| TPU B | 20 | 122 | 140 |
| TPU B | 20 | 125 | 120 |

Production of a Hybrid Material as Integral Foam (Example 1)

An aluminum mold having dimensions of 20×20×4 cm which had been heated to 50° C. was used. The mold was firstly filled to the rim with 160 g of previously expanded TPU beads and subsequently charged with 400 g of reaction mixture as shown in table 2. The matrix formulation of example 1 represents a usual polyurethane mixture for producing integral foams of medium density. The formulation for C1 represents a formulation for low-density systems in which a polymer polyol is added to obtain the mechanical properties. The mold is closed and the molding is removed after 5 minutes.

The composition and the mechanical properties of the foams are summarized in table 2:

TABLE 2

Composition and mechanical properties of hybrid foams (1) and conventional low-density foams (C1)

| | Example 1 | C1 |
|---|---|---|
| Polyol 1 | 25.0 | 25.0 |
| Polyol 2 | 57.0 | 32.9 |
| Polyol 3 | — | 29.7 |
| Chain extender | 13.0 | 8.8 |

TABLE 2-continued

Composition and mechanical properties of hybrid foams (1) and conventional low-density foams (C1)

|  | Example 1 | C1 |
|---|---|---|
| Water | 0.6 | 1.1 |
| Amine cat. | 3.0 | 1.6 |
| Tin cat. | 0.05 | 0.2 |
| Cell regulator | 0.4 | — |
| ExTPU | + | — |
| B: Iso comp. |  |  |
| Iso 1 | 133.1 | — |
| Iso 2 | — | 112.6 |
| Index | 98 | 100 |
| Mechanical properties |  |  |
| Density [g/l] | 300 | 300 |
| Density of the matrix [g/l] | 550 | 300 |
| Hardness [Asker C] | 56-58 | 56-58 |
| Split tear [N/mm] | 3.8 | 2.4 |
| Rebound resilience [%] | 51 | 46 |

Isocyanate components. Isocyanate components used were isocyanate prepolymers based on MDI and polyetherol mixtures and having an NCO content of 13.9% (Iso 1) or 18% (Iso 2).

Polyol 1 is a polyetherol based on propylene oxide/ethylene oxide and having an OH number of 29 mg KOH/g and a functionality, based on the starter, of 2. Polyol 2 is a polyetherol based on propylene oxide/ethylene oxide and having an OH number of 27 mg KOH/g and a functionality, based on the starter, of 3. Polyol 3 is a polymer polyetherol having a solids content of 45% and an OH number of 20 mg KOH/g. The chain extender is a mixture of 1,4-butanediol and ethylene glycol. As amine catalyst, use was made of a mixture of tertiary amines in glycols. The cell regulator is a surface-active silicone polymer.

The determination of the tear propagation resistance (split tear) was carried out in accordance with ASTM D3574F.

The determination of the rebound resilience was carried out in accordance with DIN 53512.

Table 2 shows that a hybrid material as per Example 1 has, compared to the foam as per C1, a significantly improved tear propagation resistance and an improved rebound resilience at the same density and the same hardness and is therefore highly suitable for use in shoe soles.

Production of a Hybrid Material as Sheet-Like Material

An isocyanate prepolymer having an NCO content of 10% by weight was prepared from 36 parts by weight of isocyanate 1, viz. a diphenylmethane diisocyanate having an NCO content of 32.2%, 2 parts by weight of isocyanate 2, viz. a modified diphenylmethane diisocyanate having an NCO content of 29.5%, and 62 parts by weight of a polyetherol based on propylene oxide and having an OH number of 56 mg KOH/g.

40 g of the isocyanate prepolymer (Prepo) produced and 200 g of expanded TPU beads having an average particle diameter of about 2 mm (ExTPU1) were mixed in a polypropylene bucket, capacity: 2.75 l, by means of a Vollrath stirrer at 700 revolutions per minute for 2 minutes. The mixture was subsequently introduced into a wooden frame having dimensions of 20×20×1.5 cm and compacted to a thickness of about 1.5 cm. The sheet-like materials obtained were stored overnight in a fume hood, removed from the mold after storage for a further 24 hours under standard conditions of temperature and humidity (23° C., 50% rel. atmospheric humidity) and stored for a further 5 days under standard conditions of temperature and humidity (Example 2).

Example 3 was carried out in a manner analogous to Example 2, with 60% by weight of the expanded TPU beads being replaced by industrial recycled rubber based on a blend of styrene-butadiene rubber (SBR) and isobutene-isoprene rubber (rubber).

Example 4 was carried out in a manner analogous to Example 2, with expanded TPU beads having an average particle diameter of about 7 mm (ExTPU2) being used instead of the expanded TPU beads having an average particle diameter of about 2 mm.

Example 5 was carried out in a manner analogous to Example 4, with 40% by weight of the expanded TPU beads being replaced by industrial recycled rubber based on a blend of styrene-butadiene rubber (SBR) and isobutene-isoprene rubber.

Comparative Example 2 was carried out in a manner analogous to Example 2, with the expanded TPU beads being replaced by industrial recycled rubber based on a blend of styrene-butadiene rubber (SBR) and isobutene-isoprene rubber.

To determine the mechanical properties of the cured foam plates, four tensile bars having a width of the narrow part of 25 mm are stamped from each plate. The tensile strength and the elongation at break are determined on these tensile bars using a method based on DIN EN ISO 1856, with a width of the narrow part of 25 mm and a test speed of 100 mm/min being used as modifications of this standard. The mean of the results for each plate was subsequently calculated. The results of these measurements and the density of the test specimens are shown in Table 3.

|  | Example 2 | Example 3 | Example 4 | Example 5 | C2 |
|---|---|---|---|---|---|
| Ex TPU1 [parts by weight] | 100 | 40 |  |  |  |
| Ex TPU2 [parts by weight] |  |  | 100 | 60 |  |
| Rubber [parts by weight] |  | 60 |  | 40 | 100 |
| Prepo [parts by weight] | 20 | 20 | 20 | 20 | 20 |
| Tensile strength [kPa] | 967 | 282 | 278 | 348 | 251 |
| Elongation at break [%] | 235 | 95 | 82 | 107 | 22 |
| Density [kg/m$^3$] | 289.6 | 463.1 | 204.5 | 305.1 | 720.4 |

Table 3 shows that a hybrid material as per Examples 2 to 5 has an improved tensile strength and an improved elongation at break at a lower density compared to Comparison 2.

The invention claimed is:

1. A process, comprising:
 (1) mixing the following components:
  a) a polyisocyanate,
  b) a compound having hydrogen atoms which are reactive toward isocyanates, and
  c) foamed particles having a closed skin, which are expanded particles (c") of thermoplastic polyurethane, and optionally,
- d) a chain extender and/or a crosslinker,
- e) a catalyst,
- f) an additional blowing agent, and
- g) a further additive, to obtain a mixture;

(2) reacting the mixture, to form a hybrid material comprising a matrix of polyurethane having the foamed particles distributed therein, wherein components a), b), and, if present, d) to g) form the matrix; wherein the matrix has a density of from 0.1 to 0.8 g/cm$^3$; and (3) preparing a shoe sole comprising said hybrid material.

2. The process according to claim 1, wherein the reaction is carried out at a temperature of the reaction mixture of from 100 to 140° C.

3. The process according to claim 1, wherein the expanded particles (c") have a diameter of from 0.1 mm to 10 cm.

4. The process according to claim 1, wherein the expanded particles (c") have a density of from 0.005 to 0.50 g/cm$^3$.

5. The process according to claim 1, wherein an isocyanate prepolymer having an NCO content of from 1 to 20% by weight is firstly prepared from components a) and b) and, optionally, components d), e) and g), and the isocyanate prepolymer is subsequently mixed with the expanded particles (c") of thermoplastic polyurethane and the composite is allowed to cure by action of water.

6. The process according to claim 5, wherein the weight ratio of the components a), b) and d) g) to component (c") is from 1:1 to 1:20.

7. The process according to claim 1, wherein the thermoplastic polyurethane of the expanded particles (c") is formed from polytetrahydrofuran having a number average molecular weight of from 600 to 2500 g/mol.

8. The process according to claim 1, wherein component a) comprises 4,4'-MDI.

9. The process according to claim 1, wherein the reacting is carried out at an index of 60 to 120.

10. The process according to claim 1, wherein the hybrid material has an elasticity of greater than 40% in accordance with DIN 53512.

11. The process according to claim 1, wherein the weight ratio of matrix to foamed particles is from 1:1 to 1:20.

12. The process according to claim 1, wherein a tear propagation resistance is greater than 2.5 N/mm at an average density of the hybrid material of from 0.4 to 0.5 g/cm$^3$, greater than 2.2 N/mm at an average density of the hybrid material of from 0.3 to <0.4 g/cm$^3$, greater than 2.0 N/mm at an average density of the hybrid material of from 0.2 to <0.3 g/cm$^3$ and greater than 1.0 N/mm at an average density of the hybrid material of from 0.1 to <0.2 g/cm$^3$.

13. The process according to claim 1, wherein
the thermoplastic polyurethane of the expanded particles (c") is formed from polytetrahydrofuran having a number average molecular weight of from 600 to 2500 g/mol;
component a) comprises 4,4'-MDI; and
the reacting is carried out at an index of 60 to 120.

14. The process according to claim 1, wherein the expanded particles (c") have a compact outer skin.

15. A process, comprising:
(1) mixing the following components:
- a) a polyisocyanate,
- b) a compound having hydrogen atoms which are reactive toward isocyanates, and
- c) foamed particles having a closed skin, which are expanded particles (c") of thermoplastic polyurethane, and optionally,
- d) a chain extender and/or a crosslinker,
- e) a catalyst,
- f) an additional blowing agent, and
- g) a further additive, to obtain a mixture;

(2) reacting the mixture, to form a hybrid material comprising a matrix of polyurethane having the foamed particles distributed therein, wherein components a), b), and, if present, d) to g) form the matrix; wherein the matrix has a density of from 0.1 to 0.8 g/cm$^3$; and (2) preparing an article comprising said hybrid material, wherein said article is upholstery, a bicycle saddle, or a surfacing for a playground, an athletic track, a playing field, or a sports hall.

16. The process according to claim 1, wherein the expanded particles (c") are spherical or ellipsoidal.

17. The process according to claim 1, wherein the matrix has a density of from 0.3 to 0.6 g/cm$^3$.

* * * * *

UNITED STATES PATENT AND TRADEMARK OFFICE
CERTIFICATE OF CORRECTION

| | |
|---|---|
| PATENT NO. | : 10,501,596 B2 |
| APPLICATION NO. | : 14/717070 |
| DATED | : December 10, 2019 |
| INVENTOR(S) | : Frank Prissok et al. |

It is certified that error appears in the above-identified patent and that said Letters Patent is hereby corrected as shown below:

In the Specification

Column 1, Line 36, "Hamer" should read -- Hanser --;

Column 6, Line 24, "weight. these" should read -- weight. These --;

Column 12, Line 64, "siloxane-oxalkylene" should read -- siloxane-oxyalkylene --;

Column 14, Line 62, "if" should read -- it --;

In the Claims

Column 21, Line 30, Claim 6, "d) g)" should read -- d)-g) --.

Signed and Sealed this
Twenty-first Day of July, 2020

Andrei Iancu
*Director of the United States Patent and Trademark Office*